(12) United States Patent
Iijima

(10) Patent No.: US 6,183,391 B1
(45) Date of Patent: Feb. 6, 2001

(54) CONTROL APPARATUS FOR AUTOMATIC TRANSMISSION

(75) Inventor: Makoto Iijima, Tokyo-To (JP)

(73) Assignee: Fuji Jukogyo Kabushiki Kaisha, Tokyo (JP)

(*) Notice: Under 35 U.S.C. 154(b), the term of this patent shall be extended for 0 days.

(21) Appl. No.: 09/477,361

(22) Filed: Jan. 4, 2000

(30) Foreign Application Priority Data

Jan. 11, 1999 (JP) .................................................. 11-004116

(51) Int. Cl.[7] .................................................. F16H 61/58
(52) U.S. Cl. .................................. 477/62; 477/63; 477/65; 477/80
(58) Field of Search .................................. 477/62, 181, 63, 477/65, 80, 169, 176, 86, 74; 192/3.3, 3.28, 3.29

(56) References Cited

U.S. PATENT DOCUMENTS

| | | | |
|---|---|---|---|
| 5,161,432 | * 11/1992 | Matsumoto et al. | 477/63 |
| 5,362,287 | * 11/1994 | Tanaka et al. | 477/175 |
| 5,480,363 | * 1/1996 | Matsubara et al. | 477/63 |
| 5,626,536 | * 5/1997 | Kono et al. | 477/181 |
| 5,667,458 | * 9/1997 | Narita et al. | 477/169 |

FOREIGN PATENT DOCUMENTS

| | | |
|---|---|---|
| 63-303258 | 12/1988 | (JP) . |
| 2-227342 | 9/1990 | (JP) . |
| 4-357357 | 12/1992 | (JP) . |

* cited by examiner

*Primary Examiner*—Charles A. Marmor
*Assistant Examiner*—Tisha D. Waddell
(74) *Attorney, Agent, or Firm*—Smith, Gambrell & Russell, LLP

(57) ABSTRACT

A control apparatus for an automatic transmission of a vehicle having a forward friction element for engaging or disengaging a turbine shaft with the automatic transmission in a forward running direction and a lock-up clutch for directly transmitting a rotation of an engine to the turbine shaft, comprises an abrupt deceleration control means for disengaging the forward engagement element and the lock-up clutch when an abrupt deceleration of the vehicle is detected, and a restoring means for canceling the abrupt deceleration control means and for restoring the forward friction element to an engagement state when an accelerator pedal is depressed for acceleration.

19 Claims, 4 Drawing Sheets

CONTROL APPARATUS FOR AUTOMATIC TRANSMISSION

BACKGROUND OF THE INVENTION

1. Field of the Invention

The present invention relates to a control apparatus for controlling an operation of an automatic transmission for a vehicle, and more particularly, to a control apparatus for disengaging a lock-up clutch when an abrupt brake is applied in order to prevent an engine stall.

2. Background Art

Japanese Patent Application Laid-open No. Toku Kai-Hei 2-227342 discloses a drive system having a torque converter with a lock-up clutch, a planetary gear type forward and reverse changeover apparatus and a continuously variable transmission (CVT). The drive system is designed to disengage the lock-up clutch of the torque converter when an anti-lock brake (ABS) operates, that is, when the wheel slip is properly controlled, so that an engine stall is prevented.

However, particularly when a vehicle is abruptly braked on a road surface having low friction coefficient, even if the vehicle is equipped with ABS, depending upon braking conditions, there is a possibility that a wheel is locked to stop the rotation before the lock-up clutch is released and as a result an engine stall occurs.

In order to solve this problem, Japanese Patent Application Laid-open No. Toku-Kai-Hei 4-357357 proposes a drive system in which both forward clutch and reverse brake of the forward and reverse changeover apparatus are set to a disengagement condition. However, releasing both of the forward clutch and reverse brake may cause an overrun of the engine, in case where a driver depresses an accelerator pedal to accelerate the vehicle immediately after an abrupt braking.

SUMMARY OF THE INVENTION

It is an object of the present invention to provide a control apparatus of an automatic transmission capable of preventing an engine stall when an abrupt brake is applied and also capable of preventing an overrun of the engine when an accelerator pedal is depressed after the abrupt brake is applied. In order to attain the object, the control apparatus for an automatic transmission of a vehicle having a forward friction element for engaging or disengaging a turbine shaft with the automatic transmission in a forward running direction and a lock-up clutch for directly transmitting a rotation of an engine to the turbine shaft, comprises an abrupt deceleration control means for disengaging the forward engagement element and the lock-up clutch when an abrupt deceleration of the vehicle is detected, and a restoring means for canceling the abrupt deceleration control means and for restoring the forward friction element to an engagement state when an accelerator pedal is depressed for acceleration.

DESCRIPRTION OF THE PREFERRED EMBODIMENTS

Figure 1:
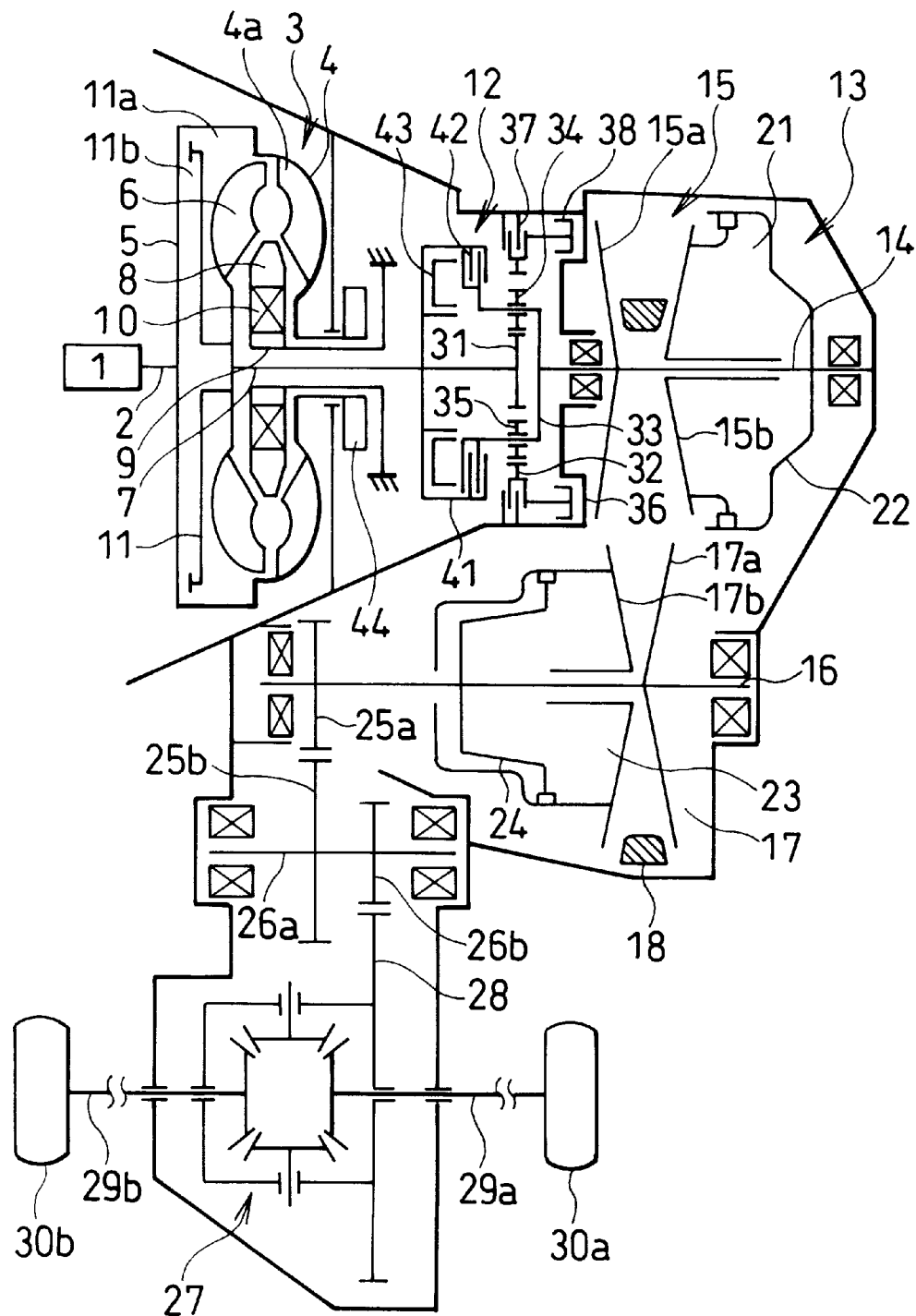
FIG. 1 is a skeleton diagram showing a drive system of an automatic transmission having a torque converter with a lock-up clutch.

Referring now to FIG. 1, reference numeral 1 denotes an engine of which a crankshaft 2 is connected with a converter case 4 of a torque converter 3 through a drive plate 5 and reference numeral 4a denotes a pump impeller provided in the converter case 4. Reference numeral 6 denotes a turbine runner disposed opposite to the pump impeller 4a and connected with a turbine shaft 7. A stator 8 is disposed between the pump impeller 4a and the turbine runner 6 and is supported by an one-way clutch 10 attached to a stator supporting shaft 9. A lock-up clutch 11 mounted on the turbine shaft 7 is designed to engage or disengage with the drive plate 5. The driving force of the engine 1 is transmitted to the turbine shaft 7 through the torque converter 3 or the lock-up clutch 11.

An apply chamber 11a is provided on one side of the lock-up clutch 11 and a release chamber 11b is provided on the other side of the lock-up clutch 11. The torque converter is operative when hydraulic pressure is supplied to the release chamber 11b and circulated through the apply chamber 11a. On the other hand, the lock-up clutch is engaged when hydraulic pressure is supplied to the apply chamber 11a and hydraulic pressure of the release chamber 11b is reduced. Further, it is possible to apply a slip control to the lock-up clutch 11 by regulating a pressure of the release chamber 11a so as to cause a slip in the lock-up clutch 11.

The driving force of the turbine shaft 7 is transferred to a primary shaft 14 of a continuously variable transmission 13 through a forward and reverse changeover apparatus 12. The primary shaft 14 is connected with a primary pulley 15 which comprises a fixed sheave 15a fixed to the primary shaft 14 and a moving sheave 15b provided opposite to the fixed sheave 15a and moving slidably in the axial direction on the primary shaft 14 through a ball spline so as to vary the groove width of the pulley 15.

A secondary pulley 17 is mounted on a secondary shaft 16 provided in parallel with the primary pulley 14. The secondary pulley 17 has a fixed sheave 17a fixed to the secondary shaft 16 and a moving sheave 17b moving slidably in the axial direction on the secondary shaft .16 so as to vary the groove width of the pulley 17.

A drive belt 18 is looped over the primary and secondary pulleys 15, 17 so as to transmit the driving force from the primary pulley 15 to the secondary pulley 17. The rotating speed of the secondary pulley 16 is continuously varied by means of changing the winding radius of the respective pulleys 15, 17 by changing the groove widths of both pulleys 15, 17.

In order to vary the groove width of the primary pulley 15, a cylinder 22 is mounted on the primary shaft 14 so that a primary oil chamber 21 is formed between the moving sheave 15b and the cylinder 22, and in order to vary the groove width of the secondary pulley 17, a plunger 24 is mounted on the secondary shaft 16 so that a secondary oil chamber 23 is formed between the moving sheave 17b and the plunger 24.

The secondary shaft 16 is connected to an intermediate shaft 26a through gears 25a, 25b, a gear 26b mounted on the intermediate shaft 26a meshes with a final reduction gear 28 of a differential 27 and the final reduction gear 28 drives wheels 30a and 30b through the differential 27 and axles 29a and 29b.

Numeral 12 denotes a forward and reverse changeover apparatus, which comprises a sun gear 31 secured to the turbine shaft 7, a carrier 33 connected with the primary shaft 14, a pair of planetary pinions 34, 35 rotatably mounted on the carrier 33 and meshing with the sun gear 31 and a ring gear 32 provided around the planetary pinions 34, 35 and meshing therewith. There is provided a reverse brake 37 between a brake cylinder 36 fixed to a housing of the forward and reverse changeover apparatus 12 and the ring gear 32 and the reverse brake 37 is actuated by a hydraulic piston 38.

The turbine shaft 7 is connected with a clutch drum 41 and a forward clutch 42 is provided between the clutch drum 41 and the carrier 33. Further, a hydraulic piston 43 is slidably mounted on the clutch drum 41 to actuate the forward clutch 42. When a hydraulic pressure is supplied to the hydraulic piston 43 to engage the forward clutch 42, the rotation force of the turbine shaft 7 is transmitted to the primary shaft 14 through the carrier 33 to rotate the turbine shaft 14 in the same direction of the turbine shaft 7. At this moment, since no hydraulic pressure is supplied to the hydraulic piston 38, the reverse brake 37 is disengaged.

On the other hand, when a hydraulic pressure is supplied to the hydraulic piston 38 under the condition of the forward clutch 42 disengaged, the reverse brake 37 is engaged to restrict the rotation of the ring gear 32. Therefore, the rotation of the turbine shaft 7 is transmitted to the carrier 33 through the pair of planetary pinions 34, 35. Then, since the ring gear 32 is fixed, the carrier 33 and the primary shaft 14 connected therewith rotate in a reverse direction to that of the turbine shaft 7.

Further, an oil pump 44 is driven by the converter case 4 to actuate hydraulic devices such as the primary pulley 15, the secondary pulley 17, the reverse brake 37, the forward clutch 42 and the like.

Figure 2:
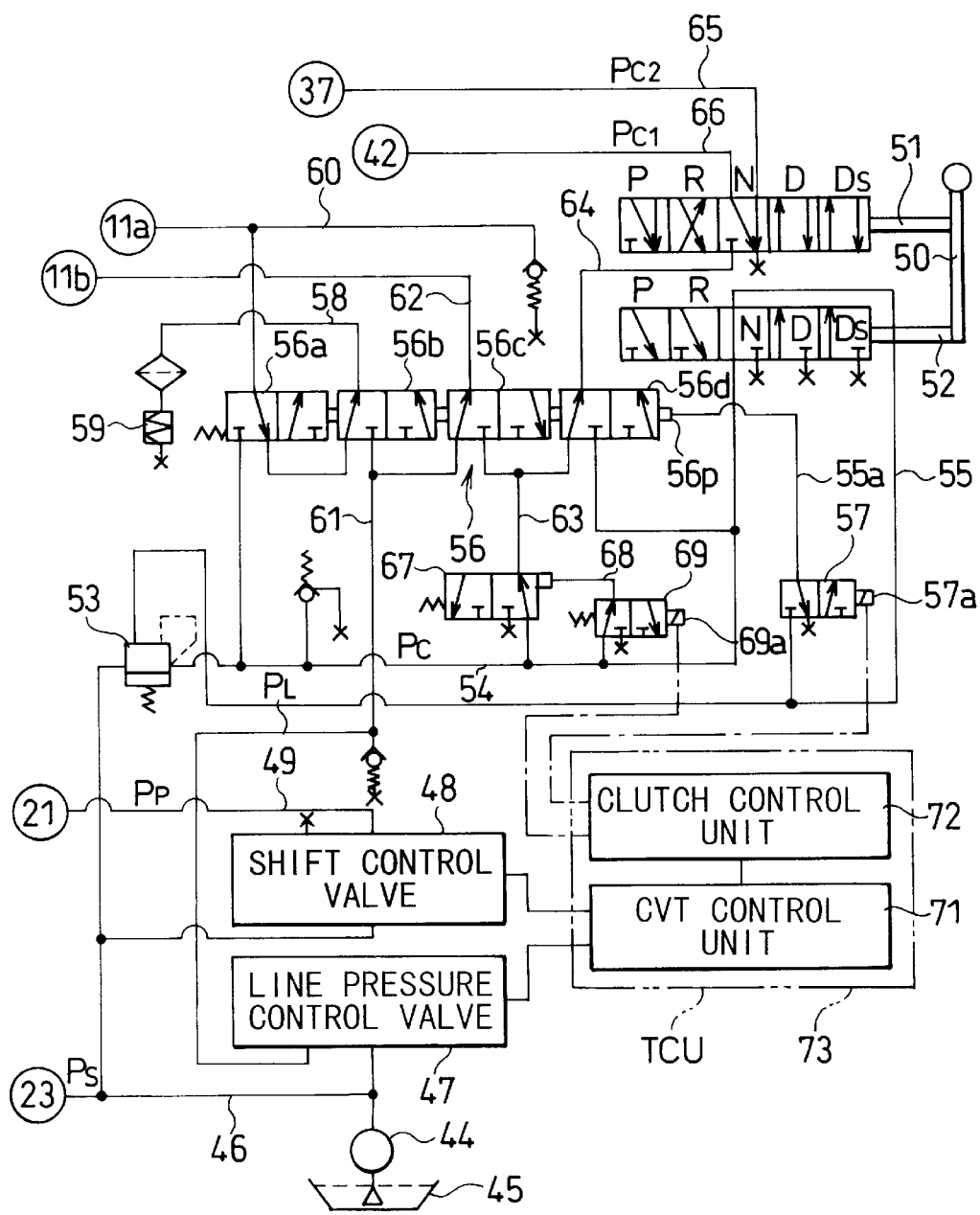
FIG. 2 is a circuit diagram showing a hydraulic control circuit for controlling the drive system of FIG. 1.

Referring to FIG. 2, the oil pump 44 sucks oil from an oil pan 45 and discharges a hydraulic pressure from a discharge port. The discharge port is connected through a secondary pressure passage 46 to the secondary oil chamber 23 for actuating the moving sheave 17*b* of the secondary pulley 17 and is connected to a secondary pressure port of a line pressure control valve 47. The line pressure control valve 47 regulates a secondary pressure Ps supplied to the secondary oil chamber 23 to a value corresponding to a driving force of the drive belt 18. That is, when the engine output is large, for example when a vehicle travels on an uphill grade or makes a sharp acceleration, the secondary pressure $P_s$ is raised to prevent a slip of the drive belt 18. When the engine output is small, the secondary pressure PS is reduced so as to save a loss of the oil pump 44.

The secondary pressure passage 46 is connected with a secondary pressure port of a shift control valve 48. A primary pressure passage 49 connected to a control pressure port of the shift control valve 48 is connected to the primary oil chamber 21 for actuating the moving sheave 15*b* of the primary pulley 15. A primary pressure Pp regulated by the shift control valve 48 is supplied to the primary oil chamber 21. Since the regulated primary pressure Pp is obtained by reducing the secondary pressure $P_S$, it does not exceed the secondary pressure PS However, since the pressure receiving area of the primary oil chamber 21 is designed to be larger than that of the secondary oil chamber 23, the clamping force of the drive belt 18 is larger on the primary pulley 15 side than on the secondary pulley 17 side. Accordingly, the speed ratio can be varied continuously by changing the groove width of the primary pulley 15 by means of controlling the primary pressure so that the primary pressure becomes a value corresponding to a target speed ratio and a target shift speed.

A selector lever 50 provided in the passenger compartment is interconnected with a manual valve 51 and a reverse signal valve 52 to change over driving modes. A driver operates the selector lever 50 to select either of five ranges, "P" (parking) range, "R" (reverse) range, "N" (neutral) range, "D" (drive) range and "Ds" (sports drive). In coordination with the operation of the selector lever 50, those valves 51, 52 take corresponding positions.

The secondary pressure passage 46 is connected to a clutch pressure passage 54 through a clutch pressure control valve 53. When the selector lever 50 is positioned at either of "N", "D" and "Ds" ranges, the clutch pressure passage 54 communicates with a pilot pressure passage 55 through the reverse signal valve 52. Further, the pilot pressure passage 55 is connected to a pilot chamber 56*p* of a switch valve 56 through a branch pressure passage 55*a* and an electromagnetic valve 57 and the switch valve 56 is operated by energizing the electromagnetic valve 57.

The switch valve 56 has a lock-up changeover section 56*a*, an oil cooler changeover section 56*b* and a lock-up release changeover section 56*c* and these are constructed so as to operate concurrently. FIG. 2 indicates a condition where no hydraulic pressure is supplied to the pilot chamber 56$_p$ of the switch valve 56. When a hydraulic pressure is supplied to the pilot chamber 56p, the switch valve 56 is changed over to other positions.

The lock-up changeover section 56*a* has two positions, one for connecting an apply pressure passage 60 communicating with the apply chamber 11*a* with an oil cooler 59 through a cooling passage 58, another for connecting the apply pressure passage 60 with the clutch pressure passage 54. The oil cooler changeover section 56*b* has two positions, one for connecting the cooling passage 58 with the apply pressure passage 60, another for connecting a lubrication oil pressure passage 61 communicating with a lubrication oil pressure port of the line pressure control valve 47 with the cooling passage 58. The lock-up release changeover section 56*c* has two positions, one for connecting a release pressure passage 62 communicating with the release chamber 11*b* with the lubrication oil pressure passage 61, another for connecting the release pressure passage 62 with the clutch pressure passage 54 through a slip pressure passage 63. The forward and reverse changeover section 56*d* has two positions, one for connecting a changeover passage 64 with the slip pressure passage 63, another for connecting the changeover pressure passage 64 with the clutch pressure passage 54.

The hydraulic piston 38 of the reverse brake 37 is connected with a brake activation pressure passage 65 and the hydraulic piston 43 of the forward clutch 42 is connected with a clutch activation pressure passage 66. The slip pressure passage 63 is provided with a slip pressure control valve 67 for regulating a slip pressure supplied to the slip pressure passage 63 to a desired pressure in accordance with an outside pilot pressure fed to an outside pilot chamber.

Further, in order to supply the outside pilot pressure to the slip pressure control valve 67, there is provided a pilot pressure passage 68 between an pilot port of the slip pressure control valve 67 and the clutch pressure passage 54. Further, there is provided an electromagnetic valve 69 in the pilot pressure passage 68 in order to control the pilot pressure. The electromagnetic valve 69 employs a duty solenoid valve in which the pilot pressure is adjusted by varying duty ratios of electric current supplied to a solenoid 69*a*. In this case, in place of the duty solenoid valve, a proportional type electromagnetic relief valve may be used.

The slip control of the lock-up clutch 11 is performed in the following manner:

When a signal is sent to the electromagnetic valve 57 to feed a hydraulic pressure to the pilot chamber 56p of the switch valve 56, the release chamber 11b of the lock-up clutch 11 communicates with the slip pressure 63. Then, the pressure of the release chamber 11b is adjusted through the slip pressure passage 63 by varying the duty ratio between 0% and 100%.

When the manual valve 51 is positioned at "D" range or "Ds" range by operating the selector lever 50, the changeover pressure passage 64 communicates with the clutch activation pressure passage 66 and as a result the forward clutch 42 is engaged by a hydraulic pressure from the clutch pressure passage 54. On the other hand, the manual valve is positioned at "R" range, the changeover pressure passage 64 communicates with the brake activation pressure passage 65 and as a result the reverse brake 37 is engaged by a hydraulic pressure from the clutch pressure passage 54.

When the manual valve 51 is positioned at other ranges, both forward clutch 42 and reverse brake 37 are disengaged.

As shown in FIG. 2, since a clutch pressure PC is supplied to the electromagnetic valve 57 at respective ranges "N", "D" and "Ds", under the ranges "D" and "Ds", the switch valve 56 is changed over by sending a signal to the electromagnetic valve 57 and as a result the clutch pressure $P_c$ is supplied to the apply chamber 11a of the torque converter. Further, a hydraulic pressure from the slip pressure control valve 67 communicates with the release pressure passage 62 and the slip pressure reduced by the electromagnetic valve 69 brings the lock-up clutch 11 into a lock-up condition. At this moment, the pilot pressure activates the clutch pressure control valve 53 through the pilot pressure passage 55 to generate a hydraulic pressure $P_{c1}$ for activating the forward clutch 42. This hydraulic pressure $P_{c1}$ is supplied to the forward clutch 42 through the clutch activation pressure passage 66.

At "R" or "P" range, no hydraulic pressure is supplied to the pilot pressure passage 55. Under this condition, the clutch pressure control valve 53 generates a hydraulic pressure $P_{c2}$ to be supplied to the reverse brake 37. The hydraulic pressure $P_{c2}$ is established at a higher pressure than the pressure $P_{c1}$ to be supplied to the forward clutch 42 ($P_{c1}$<$P_{c2}$). Thus, at reverse range, a high brake pressure can be secured.

Reference numeral 71 denotes a CVT control unit for sending control signals to the line pressure control valve 47 and the shift control valve 48 and reference numeral 72 denotes a clutch control unit for sending control signals to the electromagnetic valves 57, 69. These control units 71, 72 are included in a TCU (transmission control unit) 73 integrally.

Figure 3:
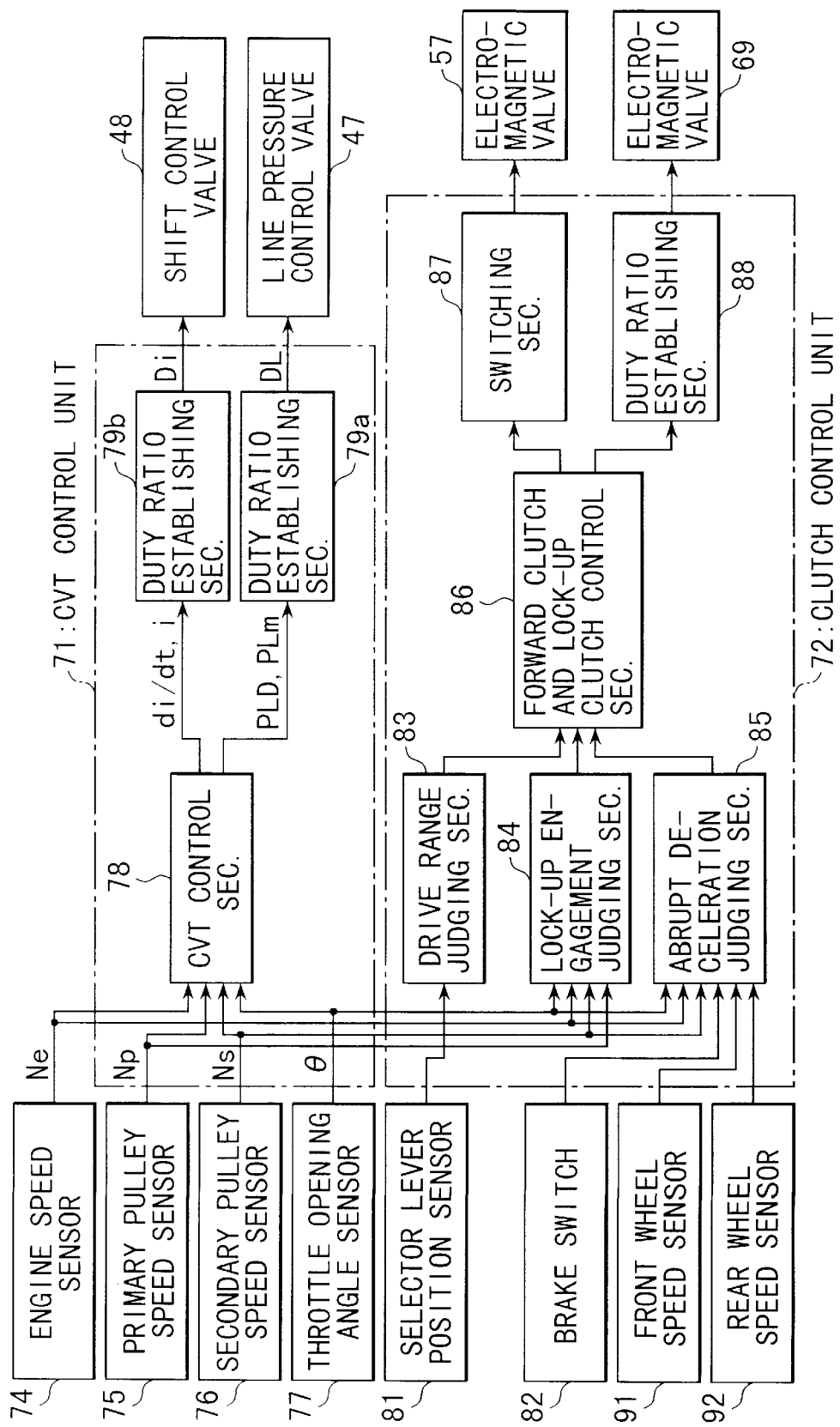
FIG. 3 is a block diagram showing control processes in a CVT control unit and a clutch control unit.

Referring to FIG. 3, the CVT control unit 71 includes a micro-computer which is connected to miscellaneous sensors such as an engine speed sensor 74, a primary pulley rotational speed sensor 75, a secondary pulley rotational speed sensor 76 and a throttle opening angle sensor 77. Signals from these sensors are sent to a continuously variable transmission control section 78 from which control signals are sent to respective solenoids of the line pressure control valve 47 and the shift control valve 48 through respective duty ratio establishing sections 79a, 79b.

The clutch control unit 72 includes a micro-computer which is connected with miscellaneous sensors, in addition to the aforesaid sensors 74 to 77, such as a selector lever position sensor 81, and a brake switch 82. In a drive range judging section 83, the current drive range is judged based on signals from the selector lever position sensor 81. In a lock-up engagement judging section 84, it is judged based on the signals from the aforesaid sensors 74 to 77 whether or not the lock-up clutch 11 should be engaged. Further, in a deceleration judging section 85, it is judged based on the signals from the aforesaid sensors 74, 76, 77 and signals from the brake switch 82, the front wheel speed sensor 91 and the rear wheel speed sensor 92, whether or not the vehicle is in an abrupt deceleration.

Based on output signals from the drive range judging section 83, the lock-up engagement judging section 84 and the deceleration judging section 85, a forward clutch and lock-up clutch control section 86 outputs control signals to a switching section 87 and a duty ratio establishing section 88. The switching section 87 outputs ON-OFF signals to the solenoid 57a of the electromagnetic valve 57 and the duty ratio establishing section 88 outputs duty signals to the solenoid 69a of the electromagnetic valve 69.

That is, the clutch control unit 72 outputs ON-OFF signals to the electromagnetic valve 57 so as to engage or disengage the lock-up clutch 11 and also outputs duty signals to the electromagnetic valve 69 so as to control the hydraulic pressure for actuating the forward clutch 42.

Thus, when the vehicle is abruptly decelerated, a signal for setting the pilot pressure of the pilot passage 68 at zero is outputted to the solenoid 69a of the electromagnetic valve 69, and at the same time, an OFF signal for setting the pilot pressure of the pilot passage 55a at zero is outputted to the solenoid 57a of the electromagnetic valve 57. As a result, the forward clutch 42 and the lock-up clutch 11 are disengaged, thereby an occurrence of the engine stall can be prevented. Further, when the accelerator pedal is depressed immediately after the abrupt acceleration, since the forward clutch 42 is engaged again, an overrun of the engine can be prevented.

In this embodiment, whether the vehicle is in an abrupt acceleration is judged based on a signal from the secondary pulley rotational speed sensor 76, however the judgment of an abrupt acceleration may be performed by an ABS operation signal. In this case, as shown in FIG. 3, the deceleration judging section 85 receives signals from a front wheel speed sensor 91 and a rear wheel speed sensor 92, respectively and judges an abrupt acceleration of the vehicle.

Figure 4:
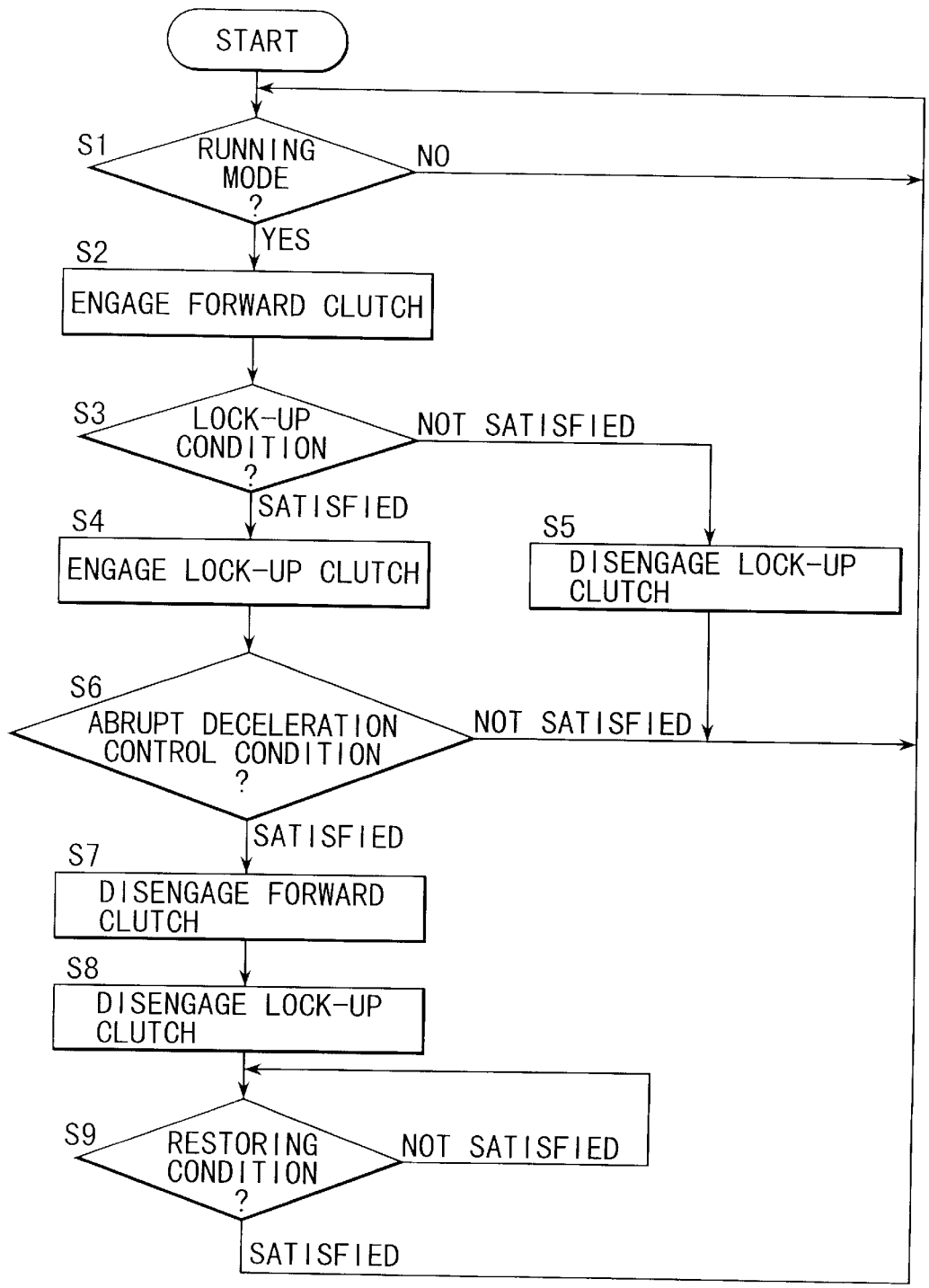
FIG. 4 is a flowchart showing a flow of control in a control apparatus of an automatic transmission.

Next, an operation of the control apparatus will be described with reference to a flowchart in FIG. 4.

First, at a step S1, it is judged whether or not the vehicle is in a running mode, namely, the selector lever is positioned at "D" or "Ds" range. If it is judged that the vehicle is in a running mode, at a step S2 a hydraulic pressure $P_{c1}$ is supplied to the hydraulic piston 43 of the forward clutch 42 to engage the forward clutch 42. The hydraulic pressure $P_{c1}$ is controlled according to a duty ratio of electric current supplied from the clutch control unit 72 to the solenoid 69a of the electromagnetic valve 69.

Then, at a step S3, it is judged whether or not a lock-up condition, that is, a running condition under which the lock-up clutch 11 is engaged, is satisfied. If the lock-up condition is satisfied, at a step S4 the lock-up clutch 11 is engaged. Generally, the lock-up condition is satisfied when the vehicle speed is larger than a specified value and the changing rate of the engine speed is smaller than a specified value.

Thus, a signal is sent to the solenoid 57 of the electromagnetic valve 57 to change the switch valve 56 from a position indicated in FIG. 2 to another position. As a result, a hydraulic pressure Pc is fed to the apply chamber 11. On the other hand, when the engagement condition is not satisfied, at a step S5 the switch valve 56 is set at a position where the lock-up clutch 11 is disengaged, namely, is set in a released condition.

At a step S6, it is judged whether or not an abrupt deceleration control condition, that is, a running condition under which an abrupt deceleration control is operated, is satisfied. If the abrupt deceleration control condition is satisfied, at a step S7 the forward clutch 42 is released and at a step S8 the lock-up clutch 11 is also released.

The condition under which the abrupt deceleration control is operated is that the brake switch 82 is turned ON, the throttle opening angle sensor 77 detects a fully closed throttle and the deceleration of the vehicle is larger than a specified value $V_B$.

In case of a vehicle employing the continuously variable transmission 13, since the vehicle speed can be detected by a signal from the secondary pulley rotational speed sensor 76, it can be detected whether the deceleration of the vehicle is larger than the specified value $V_B$ or not, by detecting a revolution number $N_s$ of the secondary pulley. For example, the abrupt deceleration condition can be judged by detecting that a differential of $N_s$ with respect to time has exceeded the specified value $V_B$, or a rate of change of the vehicle speed has exceeded a certain value.

Accordingly, when the brake is operated, a signal is sent from the brake switch 82 to the clutch control unit 72, a deceleration ($dN_s/dt$) of the vehicle is calculated based on a Ns signal from the secondary pulley rotational speed sensor 76, and it is judged that the deceleration is larger than the specified value $V_B$ (abrupt deceleration), the electromagnetic valve 57 is deenergized and at the same time a control signal of 100% duty ratio is sent to the electromagnetic valve 69 for the slip pressure control. Thus, the forward clutch 42 is released and further the hydraulic pressure in the apply chamber 11a of the lock-up clutch 11 is drained outside through the oil cooler 59, thereby an occurrence of the engine stall can be prevented.

The condition for performing the abrupt deceleration control can be considered otherwise than described before. For example, in case where the decrement of the engine speed $N_e$ becomes larger than a specified value $N_B$ while the lock-up clutch 11 is in an engagement condition, that is, in case of $dN_e/dt > N_B$, the sudden deceleration control may be performed. Further, in this case, the abrupt deceleration control may be suspended when the engine speed $N_e$ is higher than a specified value in consideration of the effect of engine brake.

A step S9 is for checking a restoring condition for canceling the abrupt deceleration control and for restoring the engagement of the forward clutch 42. While the condition is not satisfied, both forward clutch and 42 and lock-up clutch 11 continue to be released to prevent an engine stall. If the condition is satisfied, the program returns to the step S1 and when the accelerator pedal is depressed for acceleration immediately after the abrupt deceleration, the forward clutch 42 is engaged again to prevent an engine overrun.

The abrupt deceleration control is canceled, when either of the following conditions is satisfied; a case where the throttle opening angle sensor 77 detects a depression of the accelerator pedal, a case where the vehicle acceleration is larger than a specified value, a case where the engine speed is larger than a specified value, a case where a specified time (for example, 0.2 to 1 second) has elapsed after releasing the lock-up clutch 11 or a case where a difference between the engine speed Ne and the turbine speed $N_t$ is larger than a specified value, for example $N_t/N_p$ is 60 to 80%.

The construction of the forward and reverse changeover apparatus 12 is not limited to the one shown in the embodiment of the present invention. Further, in this embodiment, the automatic transmission is formed by a continuously variable transmission but the control apparatus according to the present invention can be applied to other types of automatic transmissions.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control apparatus for an automatic transmission of a vehicle having an engine, a torque converter, a turbine shaft, a forward friction element for engaging or disengaging said turbine shaft with said automatic transmission in a forward running direction and a lock-up clutch for directly transmitting a rotation of said engine to said turbine shaft, comprising:
   abrupt deceleration control for disengaging said forward friction element and said lock-up clutch as an abrupt deceleration control when said vehicle is in an abrupt braking condition; and
   restoring control for canceling said abrupt deceleration control to restore said forward friction element to an engagement state for preventing said engine from overrunning when said vehicle is in an acceleration condition immediately after said abrupt braking condition.

2. The control apparatus according to claim 1, wherein:
   said abrupt deceleration control is operated when at least a condition in which said vehicle is braked and a deceleration of said vehicle is larger than a specified value.

3. The control apparatus according to claim 1, wherein:
   said restoring control cancels said abrupt deceleration control when.

4. The control apparatus according to claim 1, wherein:
   said restoring control cancels said abrupt deceleration control when a difference between an engine speed and a turbine speed is larger than a predetermined value.

5. The control apparatus according to claim 1, wherein:
   said restoring control cancels said abrupt deceleration control when a predetermined time has elapsed after releasing said lock-up clutch.

6. The control apparatus according to claim 1, wherein:
   said restoring control cancels said abrupt deceleration control when an accelerator pedal is depressed.

7. The control apparatus according to claim 1, wherein:
   said restoring control cancels said abrupt deceleration control when an accelerator pedal is depressed.

8. The control apparatus according to claim 1, wherein:
   said abrupt deceleration control is suspended when an engine speed is larger than a predetermined value for using an effect of engine brake.

9. A control apparatus for an automatic transmission of a vehicle having an engine, a torque converter, a turbine shaft, a forward clutch for engaging or disengaging said turbine shaft with said automatic transmission in a forward running direction and a lock-up clutch for directly transmitting a rotation of said engine to said turbine shaft, comprising:

vehicle running mode judging means for judging whether said vehicle is in a forward running mode or not;

forward clutch control for operating said forward friction element to engage or disengage, said forward friction element is engaged when said vehicle is in a forward running mode;

lock-up clutch control for operating said lock-up clutch to engage or disengage, said lockup clutch is engaged when a lock-up condition is satisfied;

abrupt deceleration judging means for judging whether abrupt braking is applied to said vehicle or not;

abrupt deceleration control for controlling said forward clutch control and said lock-up clutch control to disengage said forward friction element and said lock-up clutch so as to prevent said engine from stalling when said abrupt braking is applied to said vehicle; and restoring control for judging a cancellation for said forward clutch control controlling to engage said forward friction element after said lock-up clutch is disengaged so as to prevent said engine from overrunning.

10. The control apparatus according to claim 9, wherein said vehicle running mode judging means judges said vehicle is in a forward running mode when a selector lever is positioned at "D" or "Ds" range.

11. The control apparatus according to claim 9, wherein abrupt deceleration judging means judges said abrupt brake is applied to said vehicle when deceleration speed of said vehicle is larger than a predetermined value.

12. The control apparatus according to claim 9, wherein abrupt deceleration judging means judges said abrupt brake is applied to said vehicle when a brake switch is turned on, a throttle opening angle is fully closed and a deceleration speed of said vehicle is larger than a predetermined value.

13. The control apparatus according to claim 9, wherein: said abrupt deceleration control suspends to disengage said forward friction element and said lock-up clutch even if said abrupt deceleration is applied to said vehicle when said engine speed is larger than a predetermined value in order to use engine as a brake.

14. The control apparatus according to claim 9, wherein: when said lock up clutch is in a disengagement state, said restoring control cancels said abrupt control controlling to engage said forward friction element.

15. The control apparatus according to claim 9, wherein: when a difference between an engine speed and a turbine speed is larger than a predetermined value, said restoring control cancels said abrupt control controlling to engage said forward friction element.

16. The control apparatus according to claim 9, wherein: when an engine speed is larger than a predetermined value, said restoring control cancels said abrupt control controlling to engage said forward friction element.

17. The control apparatus according to claim 9, wherein: when said engine speed is larger than a predetermined value, said restoring control cancels said abrupt control controlling to engage said forward friction element.

18. The control apparatus according to claim 9, wherein: when said accelerator pedal is depressed, said restoring control cancels said abrupt control controlling to engage said forward friction element.

19. A control method for an automatic transmission of a vehicle having, an engine mounted on said vehicle for transmitting a driving force to a wheel of said vehicle, a lock-up clutch mechanically and coaxially connected to said engine for directly transmitting a rotation of said engine to said wheel and for disconnecting therebetween, a torque converter mechanically and coaxially connected to said lock-up clutch for changing an engine speed, and a changeover apparatus for changing a turning direction of said rotation, comprising the steps of:

detecting an abrupt deceleration from a sudden decrease of said rotation;

disconnecting said changeover apparatus and said lock-up clutch immediately after detecting said abrupt deceleration; and connecting said changeover apparatus so as to avoid an engine stall and an overrun of said engine.

* * * * *